United States Patent

Masuda et al.

(10) Patent No.: US 8,053,479 B2
(45) Date of Patent: Nov. 8, 2011

(54) SILICA SOL AND METHOD FOR PRODUCING THE SAME

(75) Inventors: Norio Masuda, Kashiwa (JP); Shinsuke Ota, Fukuchiyama (JP)

(73) Assignee: Fuso Chemical Co. Ltd., Osaka (JP)

( * ) Notice: Subject to any disclaimer, the term of this patent is extended or adjusted under 35 U.S.C. 154(b) by 222 days.

(21) Appl. No.: 11/993,206

(22) PCT Filed: Jul. 25, 2007

(86) PCT No.: PCT/JP2007/064607
§ 371 (c)(1),
(2), (4) Date: Jan. 17, 2008

(87) PCT Pub. No.: WO2008/015943
PCT Pub. Date: Feb. 7, 2008

(65) Prior Publication Data
US 2009/0143490 A1 Jun. 4, 2009

(30) Foreign Application Priority Data

Jul. 31, 2006 (JP) ................................. 2006-209220

(51) Int. Cl.
*C01B 33/141* (2006.01)
*B01F 3/12* (2006.01)

(52) U.S. Cl. ........................................... 516/34; 516/86
(58) Field of Classification Search ................ 516/34
See application file for complete search history.

(56) References Cited

U.S. PATENT DOCUMENTS

| 2,630,410 A | * | 3/1953 | Clapsadle et al. | ............... 516/86 |
| 3,012,973 A | | 12/1961 | Atkins et al. | |
| 5,902,226 A | * | 5/1999 | Tasaki et al. | ................... 516/34 |
| 2003/0115806 A1 | | 6/2003 | Takami et al. | |

FOREIGN PATENT DOCUMENTS

| JP | 37-9961 | | 8/1962 |
| JP | 62270414 | | 11/1987 |
| JP | 2009708 | | 1/1990 |
| JP | 9100110 | | 4/1997 |
| JP | 9208213 | | 8/1997 |
| JP | 2004315300 | | 11/2004 |
| JP | 2004315300 A | * | 11/2004 |
| JP | 2004315343 | | 11/2004 |
| JP | 2005030219 | | 3/2005 |

OTHER PUBLICATIONS

PCT International Search Report for Fuso Chemical Co., Ltd., International App'l No. PCT/JP2007/064607, Jul. 25, 2007, Dated Oct. 30, 2007.

PCT Written Opinion of the International Searching Authority, International App'l No. PCT/JP2007/064607, Jul. 25, 2007, Dated Oct. 30, 2007.

* cited by examiner

*Primary Examiner* — Ling Choi
*Assistant Examiner* — Chun-Cheng Wang
(74) *Attorney, Agent, or Firm* — Law Offices of Albert Wai-Kit Chan, PLLC

(57) ABSTRACT

This invention provides a high-purity, high-concentrated silica sol with long-term stability and low viscosity by preventing viscosity-increase after production, and method for producing the same. In one embodiment, the silica sol produced by an alkoxide method comprises at least a dispersing agent and silica, wherein the concentration of said dispersing agent is 10-3000 ppm with respect to the silica, wherein said dispersing agent may be an inorganic acid, inorganic acid salt, organic acid or organic acid salt whose degradation temperature and boiling point are both 60° C. or higher, wherein said silica sol has a silica concentration of 20% weight or higher.

14 Claims, 1 Drawing Sheet

| | Ex1 | Ex2 | Ex3 | Ex4 | Ex5 | Ex6 | Ex7 | Ex8 | Com1 | Com2 | Com3 | Com4 | Com5 | Com6 | Com7 | Ex9 | Com8 | Com9 |
|---|---|---|---|---|---|---|---|---|---|---|---|---|---|---|---|---|---|---|
| silica concentration of reaction solution(wt%) | 3.5 | 3.4 | 3.4 | 3.5 | 3.4 | 3.4 | 3.4 | 3.5 | 3.5 | 3.5 | 3.5 | 3.5 | 3.5 | 3.5 | 3.5 | 3.5 | 3.5 | 3.5 |
| heating concentration method | after process(1) | | | | | | | | | | | | | | | | | |
| primary particle size in reaction solution (nm) | 32.1 | 33 | 33 | 32.1 | 33 | 33 | 33 | 11.8 | 32.1 | 32.1 | 11.8 | 11.8 | 11.7 | 11.7 | 11.7 | 32.1 | 32.1 | 32.1 |
| after process(1) | | | | | | | | | | | | | | | | | | |
| secondary particle size in reaction solution | 74.8 | 74 | 74 | 74.8 | 74 | 74 | 74 | 23.8 | 74.8 | 74.8 | 23.7 | 23.8 | 23.8 | 23.7 | 23.7 | 74.8 | 74 | 74.5 |
| after process(1) | | | | | | | | | | | | | | | | | | |
| dispersing agent to reaction solution | Ammonium benzoate | Ammonium benzoate | Citric acid | Citric acid | Triammonium citrate | Ammonium adipate | Tetramethyl ammonium citrate | Citric acid | Nothing | Ammonium bicarbonate | Citric acid | Citric acid | Citric acid | Citric acid | Citric acid | - | - | - |
| process(2) | | | | | | | | | | | | | | | | | | |
| amount of dispersing agent (ppm) | 660 | 1000 | 330 | 660 | 500 | 600 | 750 | 20 | 0 | 660 | 8 | 40 | 82.5 | 330 | 660 | - | - | 20 |
| silica concentration after substitution with water (wt%) | 31.4 | 35.2 | 35.5 | 36.2 | 35.3 | 35.4 | 35 | 20 | 19.5 | gelation | gelation | gelation | gelation | gelation | gelation | 21 | 20 | 14.8 |
| after process(4) | | | | | | | | | | | | | | | | | | |
| kinematic viscosity after substitution with water (cSt) | 85.3 | 15.1 | 20.2 | 8.1 | 14.6 | 13.1 | 7.7 | 2.7 | 1000 | | | | | | | 6.7 | 25.2 | |
| after process(4) | | | | | | | | | | | | | | | | | | |
| dispersing agent after substitution with water | Ammonium benzoate | Ammonium benzoate | Citric acid | Citric acid | Triammonium citrate | Ammonium adipate | Tetramethyl ammonium citrate | Citric acid | Nothing | | | | | | | Tetramethyl ammonium citrate | nothing | Ammonium bicarbonate |
| process(5) | | | | | | | | | | | | | | | | | | |
| amount of dispersing agent (ppm) | 660 | 660 | 660 | 660 | 660 | 660 | 660 | 280 | 0 | | | | | | | 750 | 0 | 2250 |
| amount of hydrogen peroxide (ppm) | 20 | 20 | 20 | 20 | 20 | 20 | 20 | 20 | 0 | | | | | | | 20 | 0 | 20 |
| process(5) | | | | | | | | | | | | | | | | | | |
| product of silica concentration (wt%) | 31.3 | 34.9 | 35.4 | 35.3 | 35.2 | 35.3 | 35.5 | 20.6 | 19.5 | | | | | | | 35.5 | gelation | 35.8 |
| product | | | | | | | | | | | | | | | | | | |
| primary particle size in product (nm) | 34.5 | 36.6 | 34.7 | 33.8 | 34.8 | 33.8 | 35 | 11.7 | 35 | | | | | | | 35 | - | 35 |
| product | | | | | | | | | | | | | | | | | | |
| secondary particle size in product (nm) | 67.5 | 69.6 | 69 | 70.4 | 69.8 | 68.6 | 67 | 24.1 | 67 | | | | | | | 67 | - | 67.2 |
| product | | | | | | | | | | | | | | | | | | |
| kinematic viscosity of product (cSt) | 6.3 | 5.1 | 5.8 | 3.7 | 5.2 | 4.9 | 8.5 | 2.2 | 1000 | | | | | | | 7.7 | - | 25.7 |
| product | | | | | | | | | | | | | | | | | | |
| pH | 7.3 | 6.9 | 7 | 7.2 | 7.2 | 7.1 | 7.2 | 7.3 | 7.1 | | | | | | | 7.2 | - | 7.2 |
| product | | | | | | | | | | | | | | | | | | |
| filtered amount(g) | 304.9 | 187.5 | 236.4 | 207 | 254.4 | 241.2 | 222.2 | 325.8 | 952.5 | | | | | | | 236.1 | - | 256.7 |
| product | | | | | | | | | | | | | | | | | | |
| metal impurity(ppb) | | | | | | | | | | | | | | | | | | |
| sodium | 120 | 122 | 123 | 124 | 125 | 127 | 127 | 184 | 60 | | | | | | | 124 | - | 108 |
| potassium | 20 | 21 | 22 | 23 | 24 | 26 | 26 | 40 | 10 | | | | | | | 21 | - | 21 |
| iron | 5 or less | 5 or less | 5 or less | 5 or less | 5 or less | 5 or less | 5 or less | 5 or less | 5 or less | | | | | | | 5 or less | - | 5 or less |
| aluminum | 10 or less | 10 or less | 10 or less | 10 or less | 10 or less | 10 or less | 10 or less | 10 or less | 10 or less | | | | | | | 10 or less | - | 14 |
| calcium | 10 or less | 10 or less | 10 or less | 10 or less | 10 or less | 10 or less | 10 or less | 10 or less | 10 or less | | | | | | | 10 or less | - | 24 |
| magnesium | 10 or less | 10 or less | 10 or less | 10 or less | 10 or less | 10 or less | 10 or less | 10 or less | 10 or less | | | | | | | 10 or less | - | 10 or less |

FIGURE 1

SILICA SOL AND METHOD FOR PRODUCING THE SAME

CROSS-REFERENCE TO RELATED APPLICATIONS

This application is the National Stage of International Application No. PCT/JP2007/064607, filed Jul. 31, 2007, which claims priority of Japanese Patent Application No. 2006-209220 filed on Jul. 31, 2006. The entire disclosures of the preceding applications are incorporated by reference herein in their entirety.

FIELD OF THE INVENTION

This invention is related to a silica sol and a method for producing the same. Specifically, this invention is related to a highly-concentrated, low-viscosity and high-purity silica sol with long-term stability, which is useful as a polishing material for silicon wafers and in the CMP process of semiconductor devices, and producing methods of the silica sol with high production efficiency by concentrating the silica sol during the production processes.

DESCRIPTION OF THE BACKGROUND ART

With a recent development of semiconductor techniques, there is a demand for a high-purity silica sol containing very few metal impurities for the silicon wafer polishing and in the CMP process of semiconductor devices because it does not contaminate materials such as silicon wafers.

The production of the silica sol containing silica at a high concentration, i.e., a highly-concentrated silica sol, is preferred because it not only raises the production efficiency but also increases the storage/transport efficiency. Further, it is preferred because it freely enables to control the compounding of polishing agents, i.e., it increases compounding flexibility. Thus, various reports regarding the highly-concentrated silica sol have been made.

Regarding the use of a silica sol in the silicon wafer polishing, it is a problem that a recycled silica sol shows a viscosity-increase which interferes with its efficacy as a polishing agent. Accordingly, a silica sol showing long-term stability and low-viscosity, even after recycling, is desired.

A silica sol with small silica particles is particularly used for the final polishing of 300 mm wafers, and it increases the flatness without causing damage (scratch-free). This silica sol is also used as a polishing agent in the CMP process for LSI provided with remarkably-miniaturized elements. The silica sol with small silica particles has high precision capable of polishing materials required to be scratch-free flat and microstructural. Thus, the highly-concentrated silica sol with small silica particles is needed.

For example, Patent application Tokukoushou No. 37-9961 (publication) discloses a method to prepare a 30% or higher concentrated-silica sol by adding monovalent cation soluble metal salts (alkali metal salt) as a dispersing agent. This method produces the highly-concentrated silica sol while maintaining a low viscosity. According to this method, the silica sol contains alkali metal salt-derived metal impurities so that a high-purity silica sol cannot be produced.

Another method using ammonium salts containing lower alkyl as a dispersing agent is also disclosed in the same document, which produces a silica sol containing no metal impurities. However, the ammonium salt is degraded in a heating process because its degradation temperature is low. This results in inadequate efficacy of ammonium salt as a dispersing agent. Moreover, the viscosity of the silica sol cannot be maintained at a constant level because the dispersing agent is degraded or vaporized during long-term storage. Thus, the viscosity is increased and the gelation is induced with time.

To solve the above problems, a silica sol containing metals at a very low concentration has recently been produced. However, the silica concentration is about 15 weight %. A production of the 15 weight % or lower silica sol has problems such as low production efficiency and low compounding flexibility of the polishing agent. It is also inappropriate with regard to transport and storage.

There is another problem regarding the production of a silica sol with small silica particles. The silica sol with small silica particles is likely to aggregate and induce the gelation of solution, compared to a silica sol with large silica particles. In consequence, the viscosity easily increases, which makes the production of the highly-concentrated silica sol with small silica particles difficult.

The silica sol with a high concentration, low viscosity and high purity in spite of any silica particle size differences is strongly desired, but no silica sol satisfying these conditions has been produced.

In view of the above problems, this invention aims at providing a high-purity and highly-concentrated silica sol with long-term stability and low viscosity by preventing the viscosity-increase during storage after the production, and methods for producing the same. This invention also aims at providing a high-purity and highly-concentrated silica sol which does not undergo the viscosity-increase or the gelation in spite of any silica particle size differences in a silica sol by adding a dispersing agent at a specific concentration to a reaction or a solvent-substitution-concentrated-solution and production methods thereof.

SUMMARY OF THE INVENTION

In one embodiment, the inventors found that a high-purity and highly-concentrated silica sol with long-term stability and low viscosity may be produced by using a dispersing agent consisting of one or more compounds with both degradation temperature and boiling point of 60° C. or higher selected from inorganic acid, inorganic acid salt, organic acid and organic acid salt. The dispersing agent may be added to the high-purity silica sol prepared by the concentration and solvent substitution of a reaction solution produced by an alkoxide method, in which alkoxysilane is hydrolyzed and condensation-polymerized, and thereby developed this invention.

One embodiment of the present invention is related to a silica sol produced by an alkoxide method, wherein said silica sol comprises at least a dispersing agent and silica, wherein said dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher, wherein said silica sol has a silica concentration of 20 weight % or higher.

Another embodiment of the present invention is related to the silica sol, wherein said silica sol has a metal impurity concentration of 1 ppm or lower.

Yet another embodiment of the present invention is related to the silica sol, wherein said silica has a primary particle size of 20 nm or smaller, wherein said dispersing agent concentration is 10-1350 ppm with respect to the silica.

Yet another embodiment of the present invention is related to a producing method of a silica sol comprising: (1) Reaction process comprising hydrolyzing and condensation-polymerizing alkoxysilane with an alkoxide method to obtain a reaction solution of the silica sol; (2) Dispersing agent-addition process comprising adding a dispersing agent to said reaction solution so that the dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher; (3) Concentration process comprising concentrating said reaction solution to obtain a concentrated solution containing silica equal to or more than that of the reaction solution obtained from said process (2); and (4) Substitution process comprising carrying out solvent substitution of said concentrated solution so that the silica sol has a silica concentration of 20 weight % or higher.

Yet another embodiment of the present invention is related to the producing method of the silica sol, wherein the silica sol obtained from said process (4) has a metal impurity concentration of 1 ppm or lower.

Yet another embodiment of the present invention is related to the producing method of the silica sol, wherein the silica in the reaction solution obtained from said process (1) has a primary particle size of 20 nm or smaller, wherein the dispersing agent added to said reaction solution in the process (2) is at a concentration of 10-30 ppm with respect to the silica.

Yet another embodiment of the present invention is related to a producing method of a silica sol comprising: (1) Reaction process comprising hydrolyzing and condensation-polymerizing alkoxysilane with an alkoxide method to obtain a reaction solution of silica sol; (2) Dispersing agent-addition process comprising adding a dispersing agent to said reaction solution so that the dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher; (3) Concentration process comprising concentrating said reaction solution to obtain a concentrated solution containing silica equal to or more than that of the reaction solution obtained from said process (2); (4) Substitution process comprising carrying out solvent substitution of said concentrated solution; and (5) Additional dispersing agent-addition process comprising further adding the dispersing agent to the solvent-substitution-concentrated-solution obtained from said process (4) so that the dispersing agent concentration is 10-3000 ppm with respect to the silica and the silica sol has a silica concentration of 20 weight % or higher.

Yet another embodiment of the present invention is related to the producing method of the silica sol, wherein the silica sol obtained from said process (5) has a metal impurity concentration of 1 ppm or lower.

Yet another embodiment of the present invention is related to the producing method of the silica sol, wherein the silica in the reaction solution obtained from said process (1) has a primary particle size of 20 nm or smaller, wherein the dispersing agent added to said reaction solution in the process (2) is at a concentration of 10-30 ppm with respect to the silica, wherein the dispersing agent concentration further added to said solvent-substitution-concentrated-solution in the process (5) is at a concentration of 10-1320 ppm with respect to the silica.

Yet another embodiment of the present invention is related to the producing method of the silica sol, wherein said dispersing agent has a degradation temperature and boiling point both equal to or higher than the maximum temperature of the solution concentrated in said process (3) and/or the concentrated solution under solvent substitution in said process (4).

One embodiment of the present invention is related to a silica sol produced by an alkoxide method, wherein said silica sol comprises at least a dispersing agent and silica, wherein said dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher, wherein said silica sol has a silica concentration of 20 weight % or higher.

This silica sol is a highly-concentrated, high-purity and low-viscosity silica sol. It has superior long-term stability in which no degradation or volatilization of the dispersing agent occurs during its storage. Accordingly, the silica sol is able to increase its compounding flexibility of the polishing agent in polishing and storage/transport efficiency.

Another embodiment of the present invention is related to the silica sol, wherein said silica sol has a metal impurity concentration of 1 ppm or lower.

Since this silica sol contains metal impurities at 1 ppm or less, it does not contaminate materials such as silicon wafers with metal impurities when it is used for a silicon wafer polishing or in the CMP process. Accordingly, this silica sol is preferable to be used as a polishing agent. In addition to the above uses as a polishing agent, this high-purity silica sol is preferably applied to various other materials such as electronic and optical materials.

Yet another embodiment of the present invention is related to the silica sol, wherein said silica has a primary particle size of 20 nm or smaller, wherein said dispersing agent concentration is 10-1350 ppm with respect to the silica.

Since this silica sol is highly-concentrated in spite of the silica particle size being small, it is used for the final polishing of 300-mm wafers, and increases flatness with scratch-free.

This silica sol is also used as a polishing agent in the CMP process for LSI provided with remarkably-miniaturized elements. The silica sol with small silica particles has high precision capable of polishing materials required to be scratch-free flat and microstructural.

Yet another embodiment of the present invention is related to a producing method of a silica sol comprising: (1) Reaction process comprising hydrolyzing and condensation-polymerizing alkoxysilane with an alkoxide method to obtain a reaction solution of the silica sol; (2) Dispersing agent-addition process comprising adding a dispersing agent to said reaction solution so that the dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher; (3) Concentration process comprising concentrating said reaction solution to obtain a concentrated solution containing silica equal to or more than that of the reaction solution obtained from said process (2); and (4) Substitution process comprising carrying out solvent substitution of said concentrated solution so that the silica sol has a silica concentration of 20 weight % or higher.

This method efficiently produces a highly-concentrated, high-purity and low-viscosity silica sol. Volume of the solvent to be added may be reduced by carrying out solvent substitution of the highly-concentrated solution after concentrating process. Saving time and labor in the production also increases production efficiency.

Yet another embodiment of the present invention is related to the producing method of the silica sol, wherein the silica sol obtained from said process (4) has a metal impurity concentration of 1 ppm or lower.

This method efficiently produces a high-purity silica sol containing metal impurities at 1 ppm or less. Since the metal impurity concentration in this silica sol is 1 ppm or less, materials such as silicon wafers are not contaminated with metal impurities when used for the silicon wafer polishing and in the CMP process. Thus, this produced silica sol is preferable as a polishing agent.

Yet another embodiment of the present invention is related to the producing method of the silica sol, wherein the silica in the reaction solution obtained from said process (1) has a primary particle size of 20 nm or smaller, wherein the dispersing agent added to said reaction solution in the process (2) is at a concentration of 10-30 ppm with respect to the silica.

According to this method, the highly-concentrated silica sol may be efficiently produced in spite of the silica particle size being small.

Yet another embodiment of the present invention is related to a producing method of a silica sol comprising: (1) Reaction process comprising hydrolyzing and condensation-polymerizing alkoxysilane with an alkoxide method to obtain a reaction solution of silica sol; (2) Dispersing agent-addition process comprising adding a dispersing agent to said reaction solution so that the dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher; (3) Concentration process comprising concentrating said reaction solution to obtain a concentrated solution containing silica equal to or more than that of the reaction solution obtained from said process (2); (4) Substitution process comprising carrying out solvent substitution of said concentrated solution; and (5) Additional dispersing agent-addition process comprising further adding the dispersing agent to the solvent-substitution-concentrated-solution obtained from said process (4) so that the dispersing agent concentration is 10-3000 ppm with respect to the silica and the silica sol has a silica concentration of 20 weight % or higher.

According to this method, the additional dispersing agent in Process (5) prevents the viscosity-increase during storage, and allows the silica sol to be highly-concentrated and to have long-term stability and low viscosity.

Yet another embodiment of the present invention is related to the producing method of the silica sol, wherein the silica sol obtained from said process (5) has a metal impurity concentration of 1 ppm or lower.

According to this method, the high-purity silica sol having the metal impurity concentration of 1 ppm or less may be efficiently produced. The silica sol having such low metal impurity of 1 ppm or lower does not contaminate materials such as silicon wafers when the silica sol is used in the silicon wafer polishing and in the CMP process. Thus, this silica sol is preferable to be used as a polishing agent.

Yet another embodiment of the present invention is related to the producing method of the silica sol, wherein the silica in the reaction solution obtained from said process (1) has a primary particle size of 20 nm or smaller, wherein the dispersing agent added to said reaction solution in the process (2) is at a concentration of 10-30 ppm with respect to the silica, wherein the dispersing agent concentration further added to said solvent-substitution-concentrated-solution in the process (5) is at a concentration of 10-1320 ppm with respect to the silica.

According to this method, the highly-concentrated silica sol may be efficiently produced in spite of the silica particle size being small. The additional dispersing agent in Process (5) prevents a viscosity-increase during storage, and allows the silica sol to be highly-concentrated and to have long-term stability and low viscosity.

Yet another embodiment of the present invention is related to the producing method of the silica sol, wherein said dispersing agent has a degradation temperature and boiling point both equal to or higher than the maximum temperature of the solution concentrated in said process (3) and/or the concentrated solution under solvent substitution in said process (4).

In this method, no degradation or volatilization of dispersing agents occurs during concentration and solvent substitution processes. Thus, the dispersing agent effectively and continuously works, and the highly-concentrated silica sol with long-term stability and low viscosity may be used.

The above-mentioned "highly-concentrated silica sol" represents a silica sol with a silica concentration higher than silica concentration of the silica sol reaction solution obtained from the hydrolysis and condensation-polymerization of alkoxysilane with the alkoxide method. Since the concentration regarded as "highly-concentrated" changes depending on the particle size and shape, the concentration is not specified, but a silica sol containing 30 weight % or higher silica is regarded as a highly-concentrated silica sol. Specifically, when a silica sol contains silica with a primary particle size of 20 nm or smaller, a silica sol containing silica at 20 weight % or higher is regarded as a highly-concentrated silica sol.

As the silica concentration in a silica sol increases, transportation and storage costs are reduced, which is favorable.

The above-mentioned "low-viscosity silica sol" represents a silica sol with a kinematic viscosity of 1000 cSt or lower, preferably 100 cSt or lower. The silica sol with a kinematic viscosity exceeding 1000 cSt is not preferred because the production efficiency decreases, e.g., more time is needed for filtration and filling.

In view of long-term stability of the silica sol, preferably kinematic viscosity does not rapidly increase during storage and it maintains at 100 cSt or lower under 60° C. for 30 days or longer.

BRIEF DESCRIPTION OF THE DRAWINGS

FIG. 1 shows the physical properties of the reaction solutions and solvent-substitution-concentrated-solutions obtained during the production process and the products after the processes of Examples 1-9 and Comparative Examples 1-9.

DETAILED DESCRIPTIONS

A silica sol of this invention includes a silica sol in a reaction solution prepared by hydrolyzing and condensation-polymerizing alkoxysilane, concentrated solution prepared by concentrating the reaction solution, and solution prepared by substituting solvent of the concentrated solution with water or other substitutes. However, hereinafter, products prepared by substituting solvent of the concentrated solution with water or other substitutes are referred to as a silica sol for the explanation of this invention.

The alkoxide method is a method comprising hydrolysis and condensation-polymerization of alkoxysilane, such as tetramethoxysilane (TMOS) and tetraethoxysilane (TEOS) to obtain a silica sol, wherein non-crystalline silica particles are dispersed in water or a hydrophilic organic solvent.

According to this method, a high-purity silica sol containing few metal impurities may be produced.

A silica sol of this invention contains at least a dispersing agent and silica.

First, the dispersing agent is explained.

The dispersing agent of this invention stably disperses silica particles in a dispersion medium in the silica sol. The presence of the dispersing agent in the silica sol strengthens repulsion between ions on the silica particle surface, which is assumed to result in a stable dispersion of the silica sol. Specifically, the disappearance of silica aggregations decreases the overall viscosity of the silica sol, which may improve the filterability.

As for the dispersing agent in this invention, any inorganic acids, inorganic acid salts, organic acids, or organic acid salts with both degradation temperature and boiling point of 60° C. or higher may be used. Examples are presented below. These dispersing agents may be used alone or in combination.

The inorganic acid includes sulfuric acid, hydrochloric acid, nitric acid, phosphoric acid, phosphorous acid, hypophosphorous acid, alkylphosphate ester, boric acid, pyrophosphoric acid, fluoroboric acid, tetrafluoroborate acid, hexafluorophosphate acid, benzenesulfonic acid and naphthalenesulfonic acid, and sulfuric acid and nitric acid are preferable.

The inorganic acid salt includes inorganic ammonium salts such as ammonium sulfate, ammonium hydrochloride, ammonium nitrate, monoammonium phosphate, ammonium dihydrogenphosphate and ammonium borate octahydrate, and ammonium sulfate and ammonium nitrate are preferable.

The organic acid includes citric acid, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid, and citric acid and benzoic acid are preferable.

The organic acid salt includes organic ammonium salts such as ammonium benzoate, triammonium citrate, ammonium dihydrogen citrate, ammonium oxalate monohydrate, ammonium formate, ammonium salicylate, ammonium adipate, ammonium acetate and tetramethylammonium citrate, and ammonium benzoate, triammonium citrate, ammonium dihydrogencitrate, and tetramethylammonium citrate are preferable.

Among the above compounds, organic acid and organic acid salt are preferred. The most preferable dispersing agents are citric acid, triammonium citrate, ammonium dihydrogencitrate, ammonium benzoate, and tetramethyl ammonium citrate. These dispersing agents are not degraded during the concentration process, and superior in maintaining the low viscosity of the silica sol because they have low kinematic viscosity and no volatilization.

A dispersing agent with degradation temperature and boiling point whose temperatures are 60° C. or higher is used. Contrary, a dispersing agent having low degradation temperature and boiling point is degraded or vaporized during long-term storage under high-temperature conditions, such as in summer time. To prevent degradation and volatilization, the degradation temperature and boiling point of a dispersing agent should be both 60° C. or higher.

It is preferable that the degradation temperature and boiling point of a dispersing agent are both equal to or higher than the maximum temperature of the concentrated solution either during concentration in process (3) concentrating the reaction solution (Process (3) described below) or during solvent substitution in process (4) carrying out solvent substitution of the concentrated solution (Process (4) described below), and more preferably, they are higher than the maximum temperatures of solution in Processes (3) and (4).

'The maximum temperature of the concentrated solution during concentration in Process (3)' represents the highest temperature among the temperature variations of the reaction solution obtained from Process (2) during Process (3). Similarly, 'the maximum temperature of the concentrated solution during solvent substitution in Process (4)' represents the highest temperature among the temperature variations of the concentrated solution obtained from Process (3) during Process (4).

When the degradation temperature and boiling point of a dispersing agent are higher than the maximum temperature in the concentration and solvent substitution processes, the degradation or volatilization of the dispersing agent does not occur during concentration and solvent substitution, which prevents the reduction of the efficacy of the dispersing agent.

When organic and inorganic acids are added as a dispersing agent, it is preferable to keep the silica sol with pH of 6.9 or higher in order to prevent aggregation which may occur at pH less than 6.9.

It is advisable that a dispersing agent does not contain metal compounds, such as alkali metal salts. Such dispersing agent avoids elevating the metal impurity concentration in the high-purity silica sol. It is also preferable that a dispersing agent contains as few metals as possible, in addition to not being a metal compound. More preferably, the metal content is 1 ppm or less. The high-purity silica sol produced using such dispersing agent does not contaminate the wafer surface with metal impurities when used as a polishing agent.

Metals that should be considered as the impurities include sodium, potassium, iron, aluminum, magnesium, and calcium, but, preferably, all metals are included.

The dispersing agent may be added during any processes in the present method for producing, thus, it may be added before and at the time of the reaction, before and at the time of the concentration, or before, at the time of, and after the substitution. However, as described below, the dispersing agent is preferably added to the reaction solution which is prepared by hydrolyzing and condensation-polymerizing alkoxysilane with the alkoxide method. This avoids a viscosity-increase and gelation in the subsequent processes, and promotes efficient concentration.

As described below, after the highly-concentrated silica sol is efficiently produced by adding the dispersing agent to the reaction solution, and carrying out solvent substitution, it is preferable to add the additional dispersing agent thereto in order to improve long-term stability.

The preferable dispersing agent concentration is 10-3000 ppm with respect to silica in the silica sol, but, more preferably, 30-1200 ppm.

This is because a silica sol having a dispersing agent concentration higher than 3000 ppm is not expected to improve the dispersion stability any more, and to be economically used. Moreover, when such silica sol is used as a polishing agent, the silica sol may contaminate the wafer surface due to the amount of dispersing agent. Thus, the dispersing agent concentration higher than 3000 ppm is not appropriate.

When a dispersing agent concentration is lower than 10 ppm, the effects of the dispersing agent may not be expected, so it is not advisable.

Secondly, silica is explained.

The silica particle size is presented as the mean particle size calculated from the specific surface area measured by the nitrogen adsorption method (BET method) (it is described as "primary particle size" below) and that measured by the light scattering method (using ELS-8000 of Otsuka Electronics Co., Ltd.) (it is described as "secondary particle size" below).

A silica sol with small particle-size silica has broad usages, and it is well used. However, the number of particles contained per unit volume is high when the silica particle size is small, which easily causes aggregation and decreases stability. This invention provides a no-aggregated, highly-concentrated and stable silica sol in spite of comprising silica particles having a primary particle size of 300 nm or smaller, specifically 10-220 nm.

Next, the dispersing agent and primary particle size of silica are explained.

When the primary particle size of silica of this invention exceeds 20 nm, it is preferable that the silica sol has a dispersing agent concentration of 10-3000 ppm with respect to silica. This enables to produce the highly-concentrated silica sol with a silica concentration of 30 weight % or higher.

When the primary particle size of silica of this invention is 20 nm or smaller, it is preferable that a dispersing agent concentration is 10-1350 ppm with respect to silica. This enables to produce the highly-concentrated silica sol with a silica concentration of 20 weight % or higher in spite of the primary silica particle size being small.

Next, a production method of a silica sol of this invention is explained.

The production method of a silica sol of this invention comprises Processes (1) to (4) described below.

(1) Reaction process comprising hydrolyzing and condensation-polymerizing alkoxysilane with an alkoxide method to obtain a reaction solution of the silica sol (2) Dispersing agent-addition process comprising adding a dispersing agent to said reaction solution so that the dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher (3) Concentration process comprising concentrating said reaction solution to obtain a concentrated solution containing silica equal to or more than that of the reaction solution obtained from said process (2)

(4) Substitution process comprising carrying out solvent substitution of said concentrated solution so that the silica sol has a silica concentration of 20 weight % or higher.

Process (1) is a reaction process in which alkoxysilane is hydrolyzed and condensation-polymerized by the alkoxide method to prepare a silica sol reaction solution.

The alkoxide method in Process (1), alkoxysilane, such as TMOS and TEOS, may be used as a material. The silica sol reaction solution produced by alkoxysilane is preferable in that the metal contents thereof, such as sodium, potassium, iron, aluminum, magnesium, and calcium contents, are very low.

Preparation of the silica sol reaction solution by the alkoxide method is essential for the high-purity silica sol production.

Process (2) is a dispersing agent-addition process, in which a dispersing agent consisting of one or more compounds selected from inorganic acid, inorganic acid salt, organic acid, and organic acid salt with both degradation temperature and boiling point of 60° C. or higher is added to the reaction solution obtained from Process (1) until the dispersing agent concentration reaches 10-3000 ppm with respect to silica.

It is preferable that the degradation temperature and boiling point of the dispersing agent added in this process are both equal to or higher than the maximum temperature either solutions concentrated in Process (3) or the concentrated solution under solvent substitution in Process (4), and more preferably, higher than the maximum temperatures of the two processes. When the degradation temperature and/or boiling point of the dispersing agent is lower than the maximum temperatures of the 2 processes, the dispersing agent is degraded in the concentration or substitution process, which causes the viscosity-increase or gelation of the silica sol.

Process (3) is a concentration process, in which the reaction solution obtained from Process (2) is concentrated to a silica concentration higher than that of the reaction solution.

The concentration method used in Process (3) is not specified, but heating concentration method and membrane concentration method are described. Specifically, the heating concentration method concentrates the reaction solution with heat while introducing reaction solution which is the same as the reaction solution. Such additional reaction solution is introduced with volume of equal to that of distillate generated from the reaction solution. The membrane concentration method uses ultrafiltration. Either method may be used for the simple, economical and industrial production of the highly-concentrated silica sol.

When the membrane concentration method is used, the silica sol may be produced by the following process order of '(A) reaction process, (B) concentration process (heating concentration), (C) substitution process, (D) dispersing agent-addition process, and (E) concentration process (membrane concentration)', but not by the following order of '(1) reaction process, (2) dispersing agent-addition process, (3) concentration process, and (4) substitution process'. Actions performed in the reaction processes (1) and (A), the dispersing agent-addition processes (2) and (D), and the substitution processes (4) and (C) are substantially the same, respectively. The concentration process (5) uses the heating method, whereas process (E) uses the membrane concentration method.

Process (4) is a substitution process, in which the concentrated solution obtained from Process (3) undergoes solvent substitution. The silica sol with a silica concentration of 20 weight % or higher is obtained. As a solvent used in Process (4), it is preferable to use water, which has the best general versatility but other hydrophilic solvents may be used.

The primary silica particle size and the dispersing agent concentration in each process are explained here.

When the primary particle size of silica in the reaction solution obtained from Process (1) exceeds 20 nm, it is preferable that the dispersing agent added in Process (2) is at a concentration of 10-3000 ppm with respect to silica. Using this production method, the highly-concentrated, high-purity and low-viscosity silica sol with a silica concentration of 30 weight % or higher may be efficiently produced.

When the primary particle size of silica in the reaction solution obtained from Process (1) is 20 nm or smaller, it is preferable that the dispersing agent added in Process (2) is at a concentration of 10-30 ppm with respect to silica. Using this production method, the highly-concentrated, high-purity and low-viscosity silica sol with a silica concentration of 20 weight % or higher may be efficiently produced, in spite of the primary silica particle size being small.

The silica sol prepared by the above Processes (1) to (4) has the following characteristics.

This silica sol is the highly-concentrated, low-viscosity and high-purity silica sol having superior stability and long-term storage. The production efficiency of this silica sol may be increased due to both time saving and labor saving during production processes. This silica sol is highly-concentrated, i.e., the silica concentration is 30 weight % or higher when the primary silica particle size is larger than 20 nm. The silica concentration thereof is 20 weight % or higher, the primary silica particle size is 20 nm or smaller. In addition, the metal impurity of the silica sol is 1 ppm or less. Accordingly, materials such as silicon wafers are not contaminated with metal impurities when this silica sol is used for the silicon wafer polishing and in the CMP process. Furthermore, this silica sol shows low viscosity. Specifically, its kinematic viscosity is 1000 cSt or lower, preferably it is 100 cSt or lower.

Process (5) described below may be performed in addition to Processes (1) to (4) of this invention.
(1) Reaction process comprising hydrolyzing and condensation-polymerizing alkoxysilane with an alkoxide method to obtain a reaction solution of silica sol
(2) Dispersing agent-addition process comprising adding a dispersing agent to said reaction solution so that the dispersing agent concentration is 10-3000 ppm with respect to the silica, wherein said dispersing agent consists of one or more compounds selected from inorganic acid, inorganic acid salt, organic acid and organic acid salt whose degradation temperature and boiling point are both 60° C. or higher
(3) Concentration process comprising concentrating said reaction solution to obtain a concentrated solution containing silica equal to or more than that of the reaction solution obtained from said process (2)
(4) Substitution process comprising carrying out solvent substitution of said concentrated solution
(5) Additional dispersing agent-addition process comprising further adding the dispersing agent to the solvent-substitution-concentrated-solution obtained from said process (4) so that the dispersing agent concentration is 10-3000 ppm with respect to the silica and the silica sol has a silica concentration of 20 weight % or higher.

For example, when the degradation temperature of the dispersing agent is lower than the maximum temperature of solutions during production processes, or when the added amount of the dispersing agent is small, it is preferable to carry out Process (5). By introducing additional dispersing agent in Process (5), the superior silica sol with long-term storage stability is produced.

When the primary particle size of silica in the reaction solution prepared in Process (1) is 20 nm or smaller, it is preferable that the dispersing agent added in Process (2) is at a concentration of 10-30 ppm with respect to silica, and the additional dispersing agent introduced in Process (5) is at a concentration of 10-1320 ppm. Using this production method, the highly-concentrated, low-viscosity and high-purity silica sol with a silica concentration of 20 weight % or higher may be efficiently produced, in spite of the primary silica particle size being small.

Hydrogen peroxide may be added to the silica sol of this invention as an antimicrobial agent to prevent microbial growth. Hydrogen peroxide suppresses microbial growth in long-term. Since metal impurities contained in the silica sol degrade hydrogen peroxide, it is not appropriate to add hydrogen peroxide to the silica sol with high-concentration of metal impurities. Hydrogen peroxide may be used appropriately as an antimicrobial agent for the silica sol with a low concentration of metal impurities, specifically, 1 ppm or less.

The concentration ranges of a dispersing agent with respect to silica of this invention (particularly, 10-30 ppm and 10-1350 ppm) are experimentally established by the inventors, but their basis is not necessarily clear. The inventors assume as below. The surface electric potential of silica particles is altered depending on the amount of the added dispersing agent. The surface potential maintains the sol state when a specific amount of the dispersing agent is added. The potential balance may be destroyed and induce gelation when the concentration deviates from the ranges. This theory has not yet been defined, and investigation is underway.

EXAMPLES

The present invention is explained by presenting examples below, but the invention is not limited to these examples.

A silica sol presented in Examples 1 to 7 and Comparative Examples 1 and 2 was prepared using silica particles with a primary particle size exceeding 20 nm and according to the heating concentration method.

Example 1

(1) Reaction Process

TMOS and methanol were mixed at a volume ratio of 3:1 to prepare a material solution. A reaction solvent was prepared by mixing methanol, purified water, and ammonia in a reaction vessel. The water and ammonia concentrations in the reaction solvent were 15 and 1 weight %, respectively.

1 volume of the material solution was added to 9 volumes of the reaction solvent under stirring by dripping at a constant rate for 25 minutes at a 20° C. reaction temperature. TMOS was hydrolyzed and condensation-polymerized, and a silica sol reaction solution was obtained (primary particle size: 32.1 nm, secondary particle size: 74.8 nm, silica concentration: 3.5 weight %).

(2) Dispersing Agent-Addition Process

A dispersing agent was added to the reaction solution obtained from the reaction process (1) at 660 ppm with respect to silica. Ammonium benzoate was used as the dispersing agent.

(3) Concentration Process

8 L of the reaction solution obtained from the dispersing agent-addition process (2) was added into a 10-L 4-necked flask. The solution was concentrated to concentrated solution with a silica concentration of 30 weight % or higher by the heating concentration method (an equivalent volume of the reaction solution obtained from Process (2) to the distillate produced by heating was added) with stirring.

(4) Substitution Process

Ultrapure water was used as a solvent carrying out solvent substitution of the concentrated solution.

The concentrated solution obtained from concentration process (3) was further heated with stirring, and an equivalent volume of ultrapure water to the distillate from the concentrated solution was added to keep a constant liquid surface level. The substitution process was completed when the liquid temperature and pH in the flask reached 100° C. and 7.4 or lower, respectively.

(5) Additional Dispersing Agent-Addition Process

The dispersing agent was further added at 660 ppm with respect to silica in the concentrated solution obtained from the substitution process (4). Ammonium benzoate was used as the dispersing agent. Hydrogen peroxide was also added as an antimicrobial agent at 20 ppm with respect to silica. The solution was then filtered through a 3 μm membrane filter, and a silica sol was obtained. The addition of the dispersing agent in Processes (2) and (5) resulted in a dispersing agent concentration of 1320 ppm with respect to silica in the silica sol. This silica sol was designated as Example 1.

Example 2

The primary and secondary particle sizes were 33.0 and 74.0 nm, respectively, and the silica concentration was 3.4 weight % in the silica sol reaction solution obtained from Process (1). In Process (2), a dispersing agent was added at 1000 ppm with respect to silica. Ammonium benzoate was used as the dispersing agent. The other procedures followed the above Processes (1) to (5) in Example 1.

Example 3

The primary and secondary particle sizes were 33.0 and 74.0 nm, respectively, and the silica concentration was 3.4 weight % in the silica sol reaction solution obtained from Process (1). In Process (2), a dispersing agent was added at 330 ppm with respect to silica. Citric acid was used as the dispersing agent. The other procedures followed the above Processes (1) to (5) in Example 1.

Example 4

The primary and secondary particle sizes were 32.1 and 74.8 nm, respectively, and the silica concentration was 3.5 weight % in the silica sol reaction solution obtained from Process (1). In Process (2), a dispersing agent was added at 660 ppm with respect to silica. Citric acid was used as the dispersing agent. The other procedures followed the above Processes (1) to (5) in Example 3.

Example 5

The primary and secondary particle sizes were 33.0 and 74.0 nm, respectively, and the silica concentration was 3.4 weight % in the silica sol reaction solution obtained from Process (1). In Process (2), a dispersing agent was added at 500 ppm with respect to silica. Triammonium citrate was used as the dispersing agent.
The other procedures followed the above Processes (1) to (5) in Example 1.

Example 6

The primary and secondary particle sizes were 33.0 and 74.0 nm, respectively, and the silica concentration was 3.4 weight % in the silica sol reaction solution obtained from Process (1). In Process (2), a dispersing agent was added at 600 ppm with respect to silica. Ammonium adipate was used as the dispersing agent. The other procedures followed the above Processes (1) to (5) in Example 1.

Example 7

The primary and secondary particle sizes were 33.0 and 74.0 nm, respectively, and the silica concentration was 3.4 weight % in the silica sol reaction solution obtained from Process (1). In Process (2), a dispersing agent was added at 750 ppm with respect to silica. Tetramethylammonium citrate was used as the dispersing agent. The other procedures followed the above Processes (1) to (5) in Example 1.

Comparative Example 1

The primary and secondary particle sizes were 32.1 and 74.8 nm, respectively, and the silica concentration was 3.5 weight % in the silica sol reaction solution obtained from Process (1). No dispersing agent was added in Process (2). The solution was concentrated to a silica concentration of 19.5 weight % in Process (3). The other procedures followed the above Processes (1) to (5) in Example 1. When the solution was concentrated to 20 weight % or higher in Process (3), the viscosity increased, and a highly-concentrated silica sol could not be prepared.

Comparative Example 2

The primary and secondary particle sizes were 32.1 and 74.8 nm, respectively, and the silica concentration was 3.5 weight % in the silica sol reaction solution obtained from Process (1). A dispersing agent was added at 660 ppm with respect to silica in Process (2). Ammonium bicarbonate was used as the dispersing agent. The other procedures followed the above Processes (1) to (3) in Example 1. Gelation occurred in Process (3), and substitution with water could not be completed. The liquid temperature in the flask was 97° C. when the gelation occurred.

A silica sol of Example 8 and Comparative Examples 3-7 were prepared as described below using silica particles with a primary particle size of 20 nm or smaller and according to the heating concentration method.

Example 8

(1) Reaction Process

TMOS and methanol were mixed at a volume ratio of 3:1 to prepare a material solution. A reaction solvent was prepared by mixing methanol, purified water, and ammonia in a reaction vessel. The water and ammonia concentrations in the reaction solvent were 15 and 0.55 weight %, respectively.

1 volume of the material solution was added to 9 volumes of the reaction solvent under stirring by dripping at a constant rate for 150 minutes at a 20° C. reaction temperature. TMOS was hydrolyzed and condensation-polymerized, and a silica sol reaction solution was obtained (primary particle size: 11.8 nm, secondary particle size: 23.8 nm, silica concentration: 3.5 weight %).

(2) Dispersing Agent-Addition Process

A dispersing agent was added to the reaction solution obtained from reaction process (1) at 20 ppm with respect to silica. Citric acid was used as the dispersing agent.

(3) Concentration Process

8 L of the reaction solution obtained from the dispersing agent-addition process (2) was added into a 10-L 4-necked flask. The solution was concentrated to concentrated solution with a silica concentration of 20 weight % or higher by the heating concentration method with stirring.

(4) Substitution Process

Ultrapure water was used as a solvent carrying out solvent substitution of the concentrated solution.

The concentrated solution obtained from concentration process (3) was further heated with stirring, and an equivalent volume of ultrapure water to the distillate from the concentrated solution was added to keep a constant liquid surface level. The substitution process was completed when the liquid temperature and pH in the flask reached 100° C. and 7.4 or lower, respectively.

(5) Additional Dispersing Agent-Addition Process

The dispersing agent was further added at 280 ppm with respect to silica to the concentrated solution obtained from the substitution process (4). Citric acid was used as the dispersing agent. Hydrogen peroxide was also added as an antimicrobial agent at 20 ppm with respect to concentrated solution. The solution was then filtered through a 3-μm membrane filter, and a silica sol was obtained. The addition of the dispersing agent in Processes (2) and (5) resulted in a dispersing agent concentration of 300 ppm with respect to silica in the silica sol. This silica sol was designated as Example 8.

Comparative Example 3

The primary and secondary particle sizes were 11.8 and 23.7 nm, respectively, and the silica concentration was 3.5 weight % in the silica sol reaction solution obtained from Process (1). In Process (2), a dispersing agent was added at 8 ppm with respect to silica. Citric acid was used as the dispersing agent. The other procedures followed the above Processes (1) to (4) in Example 8. Gelation occurred in Process (4), and substitution with water could not be completed.

Comparative Example 4

The primary and secondary particle sizes were 11.8 and 23.8 nm, respectively, and the silica concentration was 3.5 weight % in the silica sol reaction solution obtained from Process (1). In Process (2), a dispersing agent was added at 40 ppm with respect to silica. Citric acid was used as the dispersing agent. The other procedures followed the above Processes (1) to (4) in Example 8. Gelation occurred in Process (4), and substitution with water could not be completed.

Comparative Example 5

The primary and secondary particle sizes were 11.7 and 23.8 nm, respectively, and the silica concentration was 3.5 weight % in the silica sol reaction solution obtained from Process (1). In Process (2), a dispersing agent was added at 82.5 ppm with respect to silica. Citric acid was used as the dispersing agent. The other procedures followed the above Processes (1) to (4) in Example 8. Gelation occurred in Process (4), and substitution with water could not be completed.

Comparative Example 6

The primary and secondary particle sizes were 11.7 and 23.7 nm, respectively, and the silica concentration was 3.5 weight % in the silica sol reaction solution obtained from Process (1). In Process (2), a dispersing agent was added at 330 ppm with respect to silica. Citric acid was used as the dispersing agent. The other procedures followed the above Processes (1) to (4) in Example 8. Gelation occurred in Process (4), and substitution with water could not be completed.

Comparative Example 7

The primary and secondary particle sizes were 11.7 and 23.7 nm, respectively, and the silica concentration was 3.5 weight % in the silica sol reaction solution obtained from Process (1). In Process (2), a dispersing agent was added at 660 ppm with respect to silica. Citric acid was used as the dispersing agent. The other procedures followed the above Processes (1) to (4) in Example 8. Gelation occurred in Process (4), and substitution with water could not be completed.

A silica sol of Example 9 and Comparative Examples 8 and 9 were prepared as described below using silica particles with a primary particle size exceeding 20 nm and according to the membrane concentration method.

Example 9

(A) Reaction Process

TMOS and methanol were mixed at a volume ratio of 3:1 to prepare a material solution. A reaction solvent was prepared by mixing methanol, purified water, and ammonia in a reaction vessel. The water and ammonia concentrations in the reaction solvent were 15 and 1 weight %, respectively.

1 volume of the material solution was added to 9 volumes of the reaction solvent under stirring by dripping at a constant rate for 25 minutes at 20° C. reaction temperature. TMOS was hydrolyzed and condensation-polymerized, and a silica sol reaction solution was obtained (primary particle size: 32.1 nm, secondary particle, size: 74.8 nm, silica concentration: 3.5 weight %).

(B) Concentration Process

Heating Concentration

8 L of the silica sol reaction solution obtained from the reaction process (A) was added into a 10-L 4-necked flask, and concentrated to concentrated solution with a silica concentration of 19.5 weight % by the heating concentration method (an equivalent volume of the reaction solution obtained from Process (A) to the distillate produced by heating was added) with stirring.

(C) Substitution Process

Ultrapure water was used as a solvent carrying out solvent substitution of the concentrated solution.

8 L of the concentrated-silica sol solution obtained from the concentration process (B) was added into a 10-L 4-necked flask. During heating with stirring, an equivalent volume of ultrapure water to the distillate produced by heating was added to maintain a constant liquid surface level. The substitution process was completed when the liquid temperature and pH in the flask reached 100° C. and 7.4 or lower, respectively.

(D) Dispersing Agent-Addition Process

A dispersing agent was added to the substituted solution prepared by the substitution process (C) at 750 ppm with respect to silica. Tetramethylammonium citrate was used as the dispersing agent.

(E) Concentration Process

Membrane Concentration

After adding a dispersing agent in Process (D), 8 L of the substituted-silica sol solution with water was prepared. The solution was concentrated with circulation at a 40° C. liquid temperature using an ultrafiltration membrane for fractionation at a 6000-molecular-weight. The solution was cooled after the concentration, and hydrogen peroxide was added as an antimicrobial agent at 20 ppm with respect to the prepared silica sol to the silica sol containing 35 weight % silica. The silica sol was then filtered through a 3 μm membrane filter. This silica sol was designated as Example 9.

Comparative Example 8

The primary and secondary particle sizes were 32.1 and 74 nm, respectively, and the silica concentration was 3.5 weight % in the silica sol reaction solution obtained from Process (A). No dispersing agent was added in Process (D). The other procedures followed the above Processes (A) to (E) in Example 9. Gelation occurred during membrane concentration in Process (E), and silica sol could not be completely concentrated to achieve high concentration.

As shown in FIG. 1, the silica sol comprising ammonium benzoate, citric acid, triammonium citrate, ammonium adipate, or tetramethylammonium citrate as the dispersing agent was low-viscous, in spite of the silica concentration being 30 weight % or higher, as well as stable on long-term storage. Further, the metal impurity concentration of the silica sol was low.

When the primary silica particle size was 20 nm or smaller, and citric acid was added at 20 ppm with respect to silica, the silica sol showed low viscosity in spite of the silica concentration being higher than 20 weight %.

Heat stability tests of the products prepared in Examples 1 to 7 and 9 and Comparative Examples 1 and 9 were performed. The products were stored under the storage conditions shown in Table 1. After the storage, the pH, secondary particle size, and kinematic viscosity were measured. The results are shown in Table 1.

TABLE 1

| condition of storage | Ex 1 60° C. 14 days | Ex 2 60° C. 30 days | Ex 3 60° C. 30 days | Ex 4 60° C. 30 days | Ex 5 60° C. 14 days | Ex 6 60° C. 30 days | Ex 7 60° C. 30 days | Ex 9 60° C. 14 days | Com 1 60° C. 14 days | Com 9 60° C. 14 days |
|---|---|---|---|---|---|---|---|---|---|---|
| pH | 7.3 | 6.9 | 7 | 7.2 | 7.2 | 7.1 | 7.2 | 7.1 | 6.9 | 7.1 |
| secondary particle size (nm) | 67.6 | 69 | 69.8 | 70.4 | 69.3 | 68.1 | 67 | 69.3 | 69.1 | 68.3 |
| kinematic viscosity (cSt) | 6.4 | 5.2 | 5.8 | 3.7 | 5.2 | 5 | 8.5 | 8.1 | 1520 | 38.5 |

The silica concentration was 28.5 weight % when gelation occurred.

Comparative Example 9

The primary and secondary particle sizes were 32.1 and 74.5 nm, respectively, and the silica concentration was 3.5 weight % in the silica sol reaction solution obtained from Process (A). A dispersing agent was added in several deviled steps at 2250 ppm with respect to silica in Process (D). Ammonium bicarbonate was used as the dispersing agent. The other procedures followed the above Processes (A) to (E) in Example 9.

FIG. 1 shows the physical properties of the reaction solutions, solvent-substitution-concentrated-solutions after solvent substitution with water, and products of Examples 1-9 and Comparative Examples 1-9. Specifically, they included the silica concentration and particle size in the reaction solutions, type and amount of the added dispersing agent to the reaction solutions, silica concentration in and kinematic viscosity of the solvent-substitution-concentrated-solutions after solvent substitution with water, type and amount of the dispersing agent added after substitution with water, amount of added hydrogen peroxide, silica weight and particle size, kinematic viscosity, pH, filtered amount, and metal impurity in the products.

The products described above represent the silica sol obtained from Processes (5) or (E).

The filtered amount represents the amount that passed through a 4.7-ϕ membrane filter with a 3 μm pore size per 10 minutes.

Since no product could be produced due to gelation in Comparative Examples 2-8, the physical properties of the products are not shown.

As shown in Table 1, as for the product of Comparative Example 9, the kinematic viscosity was increased, and gelation was confirmed after storage at 60° C. for 60 days. Based on this finding, the use of inorganic acid salt, inorganic acid, organic acid, and organic acid salt other than ammonium bicarbonate is preferable as a dispersing agent in this invention. The concentrated silica sol could be prepared using ammonium bicarbonate, but its long-term storage stability is poor. In contrast, the long-term storage stability of the product of Example 9 using tetramethylammonium citrate was superior.

What is claimed is:

1. A silica sol produced by an alkoxide method, wherein said silica sol comprises at least a dispersing agent and silica, wherein said dispersing agent concentration is 10-3000 ppm with respect to the silica, wherein said dispersing agent consists of one or more compounds selected from the group consisting of, (a) inorganic acid selected from the group consisting of sulfuric acid, hydrochloric acid, nitric acid, phosphoric acid, phosphorous acid, hypophosphorous acid, alkylphosphate ester, boric acid, pyrophosphoric acid, fluoroboric acid, tetrafluoroborate acid, hexafluorophosphate acid, benzenesulfonic acid and naphthalenesulfonic acid, (b) inorganic acid salt selected from the group consisting of ammonium sulfate, ammonium hydrochloride, ammonium nitrate, monoammonium phosphate, ammonium dihydrogenphosphate and ammonium borate octahydrate, (c) organic acid selected from the group consisting of citric acid, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid, and (d) organic acid salt selected from the group consisting of ammonium benzoate, triammonium citrate, ammonium dihydrogen citrate, ammonium oxalate monohydrate, ammonium formate, ammonium salicylate, ammonium adipate, ammonium acetate and tetramethylammonium citrate, wherein said silica sol has a silica concentration of 20 weight % or higher, and said silica sol has a metal impurity concentration of 1 ppm or lower.

2. The silica sol according to claim 1, wherein said silica has a primary particle size of 20 nm or smaller, wherein said dispersing agent concentration is 10-1350 ppm with respect to the silica.

3. A method of producing a silica sol dispersed-in water comprising:
  (1) reaction process comprising hydrolyzing and condensation-polymerizing alkoxysilane with an alkoxide method to obtain a reaction solution of the silica sol;
  (2) dispersing agent-addition process comprising adding a dispersing agent to said reaction solution so that the dispersing agent concentration is 10-3000 ppm with respect to the silica, wherein said dispersing agent degrading and boiling at a temperature of 60° C. or higher consists of one or more compounds selected from following substances, wherein the substances comprising
    (a) inorganic acid selected from the group consisting of sulfuric acid, hydrochloric acid, nitric acid, phosphoric acid, phosphorous acid, hypophosphorous acid, alkylphosphate ester, boric acid, pyrophosphoric acid, fluoroboric acid, tetrafluoroborate acid, hexafluorophosphate acid, benzenesulfonic acid and naphthalenesulfonic acid,
    (b) inorganic acid salt selected from the group consisting of ammonium sulfate, ammonium hydrochloride, ammonium nitrate, monoammonium phosphate, ammonium dihydrogenphosphate and ammonium borate octahydrate,
    (c) organic acid selected from the group consisting of citric acid, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid, and
    (d) organic acid salt selected from the group consisting of ammonium benzoate, triammonium citrate, ammonium dihydrogen citrate, ammonium oxalate monohydrate, ammonium formate, ammonium salicylate, ammonium adipate, ammonium acetate and tetramethylammonium citrate;
  (3) concentration process comprising concentrating said reaction solution to obtain a concentrated solution containing silica equal to or more than that of the reaction solution obtained from said process (2); and
  (4) substitution process comprising carrying out solvent substitution of said concentrated solution with water so that the silica sol dispersed-in-water has a silica concentration of 20 weight % or higher.

4. The method of producing the silica sol according to claim 3, wherein the silica sol obtained from said process (4) has a metal impurity concentration of 1 ppm or lower.

5. A method of producing a silica sol comprising:
  (1) reaction process comprising hydrolyzing and condensation-polymerizing alkoxysilane with an alkoxide method to obtain a reaction solution of the silica sol;
  (2) dispersing agent-addition process comprising adding a dispersing agent to said reaction solution so that the dispersing agent concentration is 10-3000 ppm with respect to the silica, wherein said dispersing agent degrading and boiling at a temperature of 60° C. or higher comprises one or more compounds selected from the group consisting of
    (a) inorganic acid selected from the group consisting of sulfuric acid, hydrochloric acid, nitric acid, phosphoric acid, phosphorous acid, hypophosphorous acid, alkylphosphate ester, boric acid, pyrophosphoric acid, fluoroboric acid, tetrafluoroborate acid, hexafluorophosphate acid, benzenesulfonic acid and naphthalenesulfonic acid,
    (b) inorganic acid salt selected from the group consisting of ammonium sulfate, ammonium hydrochloride, ammonium nitrate, monoammonium phosphate, ammonium dihydrogenphosphate and ammonium borate octahydrate,
    (c) organic acid selected from the group consisting of citric acid, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid, and
    (d) organic acid salt selected from the group consisting of ammonium benzoate, triammonium citrate, ammonium dihydrogen citrate, ammonium oxalate monohydrate, ammonium formate, ammonium salicylate, ammonium adipate, ammonium acetate and tetramethylammonium citrate;
  (3) concentration process comprising concentrating said reaction solution to obtain a concentrated solution containing silica equal to or more than that of the reaction solution obtained from said process (2); and
  (4) substitution process comprising carrying out solvent substitution of said concentrated solution with water so that the silica sol dispersed-in-water has a silica concentration of 20 weight % or higher,
  wherein the silica in the reaction solution obtained from said process (1) has a primary particle size of 20 nm or smaller, wherein the dispersing agent added to said reaction solution in the process (2) is at a concentration of 10-30 ppm with respect to the silica, wherein the silica sol obtained from process (4) has a metal impurity concentration of 1 ppm or lower.

6. A method of producing a silica sol dispersed-in-water comprising:
  (1) reaction process comprising hydrolyzing and condensation-polymerizing alkoxysilane with an alkoxide method to obtain a reaction solution of silica sol;
  (2) dispersing agent-addition process comprising adding a dispersing agent to said reaction solution, wherein said dispersing agent degrading and boiling at a temperature of 60° C. or higher comprises one or more compounds selected from the group consisting of (a) inorganic acid selected from the group consisting of sulfuric acid, hydrochloric acid, nitric acid, phosphoric acid, phosphorous acid, hypophosphorous acid, alkylphosphate ester, boric acid, pyrophosphoric acid, fluoroboric acid, tetrafluoroborate acid, hexafluorophosphate acid, benzenesulfonic acid and naphthalenesulfonic acid, (b) inorganic acid salt selected from the group consisting of ammonium sulfate, ammonium hydrochloride, ammonium nitrate, monoammonium phosphate, ammonium dihydrogenphosphate and ammonium borate octahydrate, (c) organic acid selected from the group consisting of citric acid, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid, and (d) organic acid salt selected from the group consisting of ammonium benzoate, triammonium citrate, ammonium dihydrogen citrate, ammonium oxalate monohydrate, ammonium formate, ammonium salicylate, ammonium adipate, ammonium acetate and tetramethylammonium citrate;

(3) concentration process comprising concentrating said reaction solution to obtain a concentrated solution containing silica equal to or more than that of the reaction solution obtained from said process (2);

(4) substitution process comprising carrying out solvent substitution of said concentrated solution with water; and (5) additional dispersing agent-addition process comprising further adding the dispersing agent to the solvent-substitution-concentrated-solution obtained from said process (4) so that the dispersing agent concentration is 10-3000 ppm with respect to the silica and the silica sol dispersed-in water has a silica concentration of 20 weight % or higher.

7. The method of producing the silica sol according to claim 6, wherein the silica sol obtained from said process (5) has a metal impurity concentration of 1 ppm or lower.

8. A method of producing a silica sol dispersed-in-water comprising:

(1) reaction process comprising hydrolyzing and condensation-polymerizing alkoxysilane with an alkoxide method to obtain a reaction solution of silica sol;

(2) dispersing agent-addition process comprising adding a dispersing agent to said reaction solution, wherein said dispersing agent degrading and boiling at a temperature of 60° C. or higher comprises one or more compounds selected from the group consisting of (a) inorganic acid selected from the group consisting of sulfuric acid, hydrochloric acid, nitric acid, phosphoric acid, phosphorous acid, hypophosphorous acid, alkylphosphate ester, boric acid, pyrophosphoric acid, fluoroboric acid, tetrafluoroborate acid, hexafluorophosphate acid, benzenesulfonic acid and naphthalenesulfonic acid, (b) inorganic acid salt selected from the group consisting of ammonium sulfate, ammonium hydrochloride, ammonium nitrate, monoammonium phosphate, ammonium dihydrogenphosphate and ammonium borate octahydrate, (c) organic acid selected from the group consisting of citric acid, oxalic acid, malic acid, maleic acid, tartaric acid, glutaric acid, adipic acid, pimelic acid, succinic acid, malonic acid, fumaric acid, phthalic acid, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid and lactic acid, and (d) organic acid salt selected from the group consisting of ammonium benzoate, triammonium citrate, ammonium dihydrogen citrate, ammonium oxalate monohydrate, ammonium formate, ammonium salicylate, ammonium adipate, ammonium acetate and tetramethylammonium citrate;

(3) concentration process comprising concentrating said reaction solution to obtain a concentrated solution containing silica equal to or more than that of the reaction solution obtained from said process (2);

(4) substitution process comprising carrying out solvent substitution of said concentrated solution; and (5) additional dispersing agent-addition process comprising further adding the dispersing agent to the solvent-substitution-concentrated-solution obtained from said process (4) so that the dispersing agent concentration is 10-3000 ppm with respect to the silica and the silica sol has a silica concentration of 20 weight % or higher, wherein the silica in the reaction solution obtained from said process (1) has a primary particle size of 20 nm or smaller, wherein the dispersing agent added to said reaction solution in the process (2) is at a concentration of 10-30 ppm with respect to the silica, wherein the dispersing agent concentration further added to said solvent-substitution-concentrated-solution in the process (5) is at a concentration of 10-1320 ppm with respect to the silica, wherein the silica sol obtained from process (5) has a metal impurity concentration of 1 ppm or lower.

9. The method of producing the silica sol according to claim 3, wherein said dispersing agent has a degradation temperature and boiling point both equal to or higher than the maximum temperature of the solution concentrated in said process (3) and/or the concentrated solution under solvent substitution in said process (4).

10. The method of producing the silica sol according to claim 4, wherein said dispersing agent has a degradation temperature and boiling point both equal to or higher than the maximum temperature of the solution concentrated in said process (3) and/or the concentrated solution under solvent substitution in said process (4).

11. The method of producing the silica sol according to claim 5, wherein said dispersing agent has a degradation temperature and boiling point both equal to or higher than the maximum temperature of the solution concentrated in said process (3) and/or the concentrated solution under solvent substitution in said process (4).

12. The method of producing the silica sol according to claim 6, wherein said dispersing agent has a degradation temperature and boiling point both equal to or higher than the maximum temperature of the solution concentrated in said process (3) and/or the concentrated solution under solvent substitution in said process (4).

13. The method of producing the silica sol according to claim 7, wherein said dispersing agent has a degradation temperature and boiling point both equal to or higher than the maximum temperature of the solution concentrated in said process (3) and/or the concentrated solution under solvent substitution in said process (4).

14. The method of producing the silica sol according to claim 8, wherein said dispersing agent has a degradation temperature and boiling point both equal to or higher than the maximum temperature of the solution concentrated in said process (3) and/or the concentrated solution under solvent substitution in said process (4).

* * * * *